United States Patent
Park et al.

(10) Patent No.: US 12,209,988 B2
(45) Date of Patent: Jan. 28, 2025

(54) SENSOR AND METHOD OF MANUFACTURING THE SAME

(71) Applicants: ELECTRONICS AND TELECOMMUNICATIONS RESEARCH INSTITUTE, Daejeon (KR); Pusan National University Industry-University Cooperation, Busan (KR)

(72) Inventors: Hyung Ju Park, Suwon (KR); A Hyeon Ma, Busan (KR); Ki Min Nam, Busan (KR); Dae-Sik Lee, Daejeon (KR)

(73) Assignees: Electronics and Telecommunications Research Institute, Daejeon (KR); Pusan National University Industry-University Cooperation, Busan (KR)

( * ) Notice: Subject to any disclaimer, the term of this patent is extended or adjusted under 35 U.S.C. 154(b) by 490 days.

(21) Appl. No.: 17/566,630

(22) Filed: Dec. 30, 2021

(65) Prior Publication Data

US 2022/0120707 A1 Apr. 21, 2022

Related U.S. Application Data (63) Continuation-in-part of application No. 16/880,667, filed on May 21, 2020, now abandoned.

(30) Foreign Application Priority Data

May 24, 2019 (KR) .................. 10-2019-0061152
Apr. 17, 2020 (KR) .................. 10-2020-0046659

(51) Int. Cl.
G01N 27/414 (2006.01)

(52) U.S. Cl.
CPC ..... *G01N 27/4146* (2013.01); *G01N 27/4141* (2013.01)

(58) Field of Classification Search
CPC .......... G01N 27/4146; G01N 27/4141; G01N 27/127
See application file for complete search history.

(56) References Cited

U.S. PATENT DOCUMENTS 5,783,153 A 7/1998 Logothetis et al.
10,465,184 B2 11/2019 Park et al.
(Continued)

FOREIGN PATENT DOCUMENTS

KR 1019960010681 B1 8/1996
KR 10-2010-0008550 A 1/2010
(Continued)

OTHER PUBLICATIONS

Jang et al., "Spontaneous Phase Transition of Hexagonal Wurtzite CoO: Application to Electrochemical and Photoelectrochemical Water Splitting," Chemical Communications, 2017, pp. 4120-4123 (Year: 2017).*

(Continued)

*Primary Examiner* — Kyoung Lee
*Assistant Examiner* — Sophia W Kao (57) ABSTRACT

Disclosed is a sensor and a method of manufacturing the same. The method includes forming a plurality of electrodes on a substrate and forming a sensor layer on the substrate between the plurality of electrodes. The forming of the sensor layer includes coating a nanoparticle layer, providing deionized water on the nanoparticle layer to form a spontaneous transition layer, and annealing the spontaneous transition layer to form the sensor layer.

16 Claims, 13 Drawing Sheets

(56) References Cited

U.S. PATENT DOCUMENTS

| | | | |
|---|---|---|---|
| 11,137,368 B2 * | 10/2021 | Stowell | G01N 27/4145 |
| 11,525,797 B2 * | 12/2022 | Rong | G01N 27/122 |
| 2010/0147684 A1 * | 6/2010 | Park | G01N 27/127 |
| | | | 204/431 |
| 2016/0091447 A1 * | 3/2016 | Yu | G01N 27/125 |
| | | | 73/31.06 |
| 2016/0207864 A1 * | 7/2016 | Ajiri | C02F 11/06 |
| 2017/0021339 A1 * | 1/2017 | Na | B01J 23/78 |
| 2018/0299395 A1 * | 10/2018 | Kalantar-Zadeh ... | G01N 27/128 |
| 2019/0187135 A1 | 6/2019 | Kim et al. | |
| 2022/0155247 A1 * | 5/2022 | Park | G01N 27/407 |
| 2023/0266291 A1 * | 8/2023 | Myrick | H10K 30/00 |

FOREIGN PATENT DOCUMENTS

| | | | |
|---|---|---|---|
| KR | 10-2010-0067972 A | 6/2010 | |
| KR | 1020130095065 A | 8/2013 | |
| KR | 10-1646610 B1 | 8/2016 | |

OTHER PUBLICATIONS

Chen et al "Synthesis and surface activity of single-crystalline Co3O4 (111) holey nanosheets" Nanoscale 2010, vol. 2, Jun. 18, 2010, pp. 1657-1660 (Year: 2010).*

Hierarchically Structured Cobalt Oxide (Co3O4 ):"Hierarchically Structured Cobalt Oxide (Co 3 O4 ): The Morphology Control and Its Potential in Sensors" The Journal of Physical Chemistry.B vol. 110 Issue 32, Aug. 17, 2006, pp. 15858-15863 (Year: 2006).*

Jang et al., "Spontaneous Phase Transition of Hexagonal Wurtzite CoO: Application to Electrochemical and Photoelectrochemical Water Splitting," Chemical Communications, 2017, pp. 1-4.

* cited by examiner

SENSOR AND METHOD OF MANUFACTURING THE SAME

CROSS-REFERENCE TO RELATED APPLICATIONS

This application is a continuation-in-part of application Ser. No. 16/880,667, filed May 21, 2020, which claims benefit of priority to Korean Patent Application No. 10-2019-0061152 filed on May 24, 2019 and No. 10-2020-0046659 field on Apr. 17, 2019, the entire contents of which are hereby incorporated by reference.

BACKGROUND

The present disclosure herein relates to a sensor and a method of manufacturing the same, and more particularly, to a sensor including a sensor layer of metal oxide and a method for manufacturing the same.

In order to fix nanoparticles of a metal oxide, which is used for a material of a semiconductor type gas sensor, on a device electrode mainly in a powder form, a highly viscous organic bonding agent such as alpha-terpineol is added. However, in order for the nanoparticles to maintain a gas response, the used bonding agent is to be removed, and for this purpose, high-temperature heat is applied to remove the bonding agent. However, in this case, contamination of the nanoparticles may occur due to components remaining after burning by heat, and in addition, the space between sensor materials and the space between the sensing material and the device may be affected, which may result in the occurrence of unexpected characteristics. Therefore, it is required to develop a sensing material capable of improving characteristics of a gas sensor while stably immobilizing the nanoparticles in powder form on a device surface without any additives.

SUMMARY

The present disclosure provides a method of manufacturing a sensor capable of increasing a response to gas.

The present disclosure also provides a method of manufacturing a sensor capable of increasing an adhesive force of a sensor layer.

An embodiment of the inventive concept provides a method of manufacturing a sensor. The method includes forming a plurality of electrodes on a substrate and forming a sensor layer on the substrate between the plurality of electrodes. Here, forming the sensor layer includes: coating a nanoparticle layer to the substrate; providing deionized water on the nanoparticle layer to form a spontaneous transition layer which includes cobalt hydroxide; and annealing the spontaneous transition layer at a temperature of 300° C. to 700° C. to form the sensor layer.

In an embodiment, the nanoparticle layer may include a first cobalt oxide (CoO).

In an embodiment, the nanoparticle layer may have hexagonal pyramid-shaped nanoparticles.

In an embodiment, the sensor layer has a response of 0.6 to 0.7 and a long term stability of 0.5 to 0.6.

In an embodiment, the sensor layer may include a second cobalt oxide ($Co_3O_4$).

In an embodiment, the spontaneous transition layer may be annealed at a temperature lower than a melting point of the second cobalt oxide.

In an embodiment, the annealed temperature may be 500° C.

In an embodiment, the spontaneous transition layer may have a first plate crystal, and the sensor layer may have a second plate crystal similar to the first plate crystal.

In an embodiment, the second plate crystal may have a hexagonal octahedron shape.

In an embodiment, the nanoparticle layer may have a first thickness, and the spontaneous transition layer may have a second thickness smaller than the first thickness.

In an embodiment, the first thickness may be 600 nm, and the second thickness may be 300 nm.

In an embodiment, the sensor layer may have a third thickness equal to or smaller than the second thickness.

In an embodiment, forming the sensor layer may further include forming a preliminary sensor layer having the third thickness.

In an embodiment, the method may further include forming a heater electrode on a bottom surface of the substrate facing the plurality of electrodes and the sensor layer.

In an embodiment, forming the sensor layer may further include preparing nanoparticles, and the nanoparticles may be prepared according to a standard Schlenk line technique.

In an embodiment, the preparing of the nanoparticles may include: obtaining a mixed solution of cobalt acetylacetonate and benzyl amine; stirring the mixed solution to precipitate the nanoparticles; and removing supernatant in the mixed solution to extract the nanoparticles.

An embodiment of the inventive concept provides a sensor including: a substrate; a plurality of electrodes disposed on the substrate; and a sensor layer disposed on the substrate between the plurality of electrodes. Here, the sensor layer may include a cobalt oxide having a hexagonal octahedron-shaped plate crystal.

In an embodiment, the plate crystal may have a (111) plane.

In an embodiment, the sensor may further include a heater electrode disposed on a bottom surface of the substrate.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, exemplary embodiments of the inventive concept will be described in detail with reference to the accompanying drawings. Advantages and features of the inventive concept, and methods for achieving the advantages and features will be clarified with reference to embodiments described below in detail together with the accompanying drawings. However, the inventive concept is not limited to the embodiments described herein, but may be embodied in different forms. Rather, the embodiments described herein are provided to ensure that the disclosed contents are thorough and complete and that the spirit of the inventive concept is fully conveyed to those skilled in the art, and the inventive concept is only defined by the scope of the claims. Like components will be denoted by like reference numerals through the specification.

The terminology used herein is for describing the embodiments and is not intended to limit the inventive concept. In the specification, the singular forms are intended to include the plural forms as well, unless the context clearly indicates otherwise. It will be further understood that the terms "comprises" or "includes" and/or "comprising" or "including", when used in this specification, specify the presence of stated components, steps, operations, and/or devices, but do not preclude the presence or addition of one or more other components, steps, operations, and/or devices. In addition, it will be also understood that, in the specification, terms, "electrode", "layer", and "film" have the same meaning as commonly understood in the semiconductor field. Since reference numerals are presented in the order of description according to embodiments, the reference numerals are not necessarily limited to the order.

Figure 1:
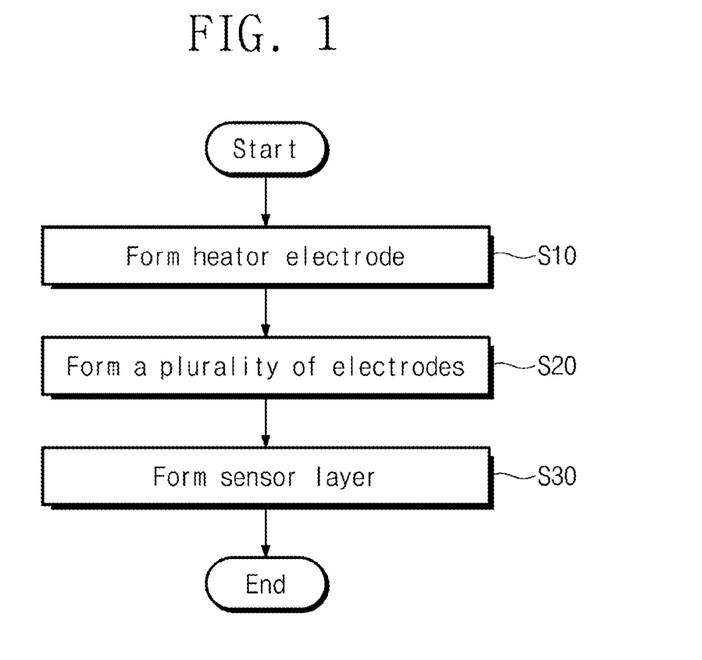
FIG. 1 is a flow chart showing an example of a method of manufacturing a sensor according to an embodiment of the inventive concept.

FIG. 1 illustrates an example of a method of manufacturing a sensor according to the inventive concept. FIGS. 2 to 7 are process cross-sectional views illustrating the method of manufacturing a sensor according to the inventive concept of FIG. 1.

Figure 2:
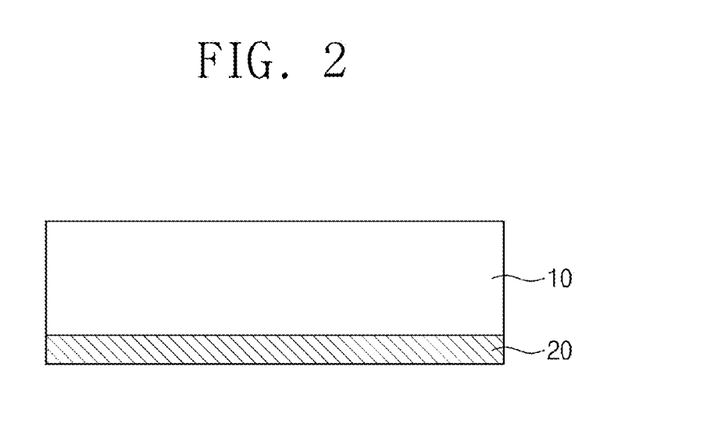
FIGS. 2 to 7 are process cross-sectional views illustrating the method of manufacturing a sensor according to an embodiment of the inventive concept of FIG. 1.

Referring to FIGS. 1 and 2, a heater electrode 20 is formed on a bottom surface of a substrate 10 (S10). The heater electrode 20 may include a nickel chromium alloy formed by a metal evaporation method or a plasma deposition method. The substrate 10 may include silicon, quartz, or glass, and the embodiment of the inventive concept is not limited thereto.

Figure 3:
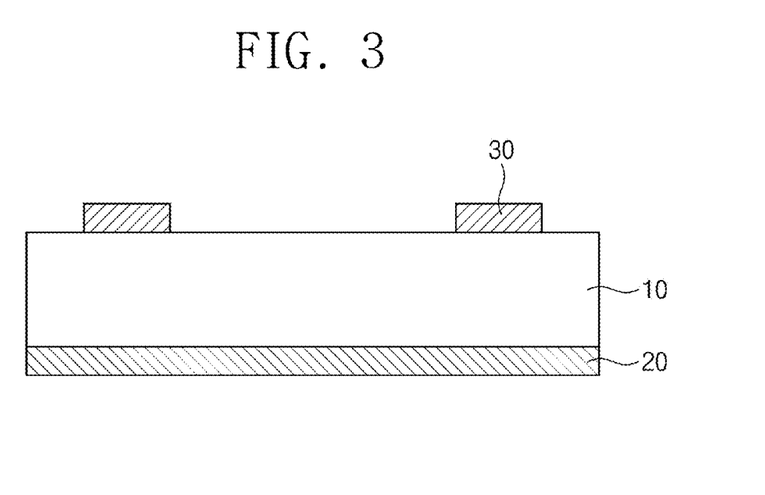

Referring to FIGS. 1 and 3, a plurality of electrodes 30 is formed on an upper surface of the substrate 10 (S20). The plurality of electrodes 30 may include at least one metal of gold (Au), silver (Ag), aluminum (Al), tungsten (W), copper (Cu), manganese (Mg), or tantalum (Ta). The plurality of electrodes 30 may be formed by a metal deposition process, a photolithography process, and an etching process. The metal deposition process may include a metal evaporation method and a plasma deposition method.

Referring to FIGS. 1 and 4 to 7, a sensor layer 70 is formed on the plurality of electrodes 30 and the substrate 10 between the plurality of electrodes 30 (S30).

Figure 7:
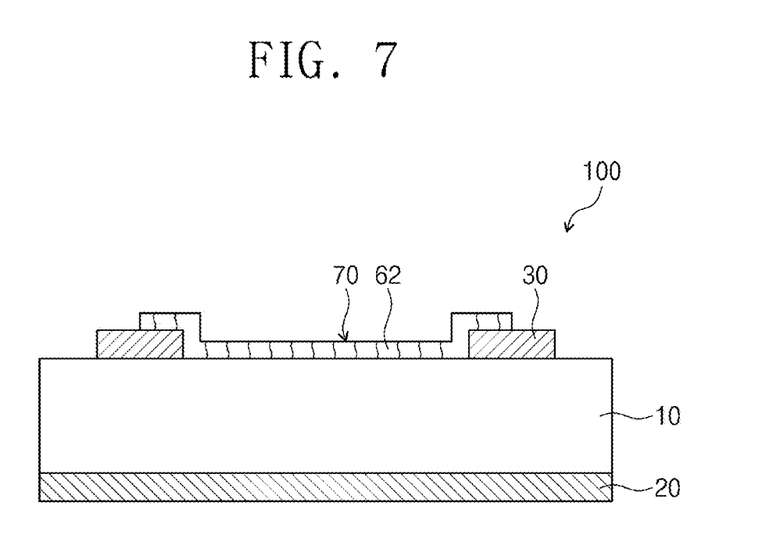
Figure 8:
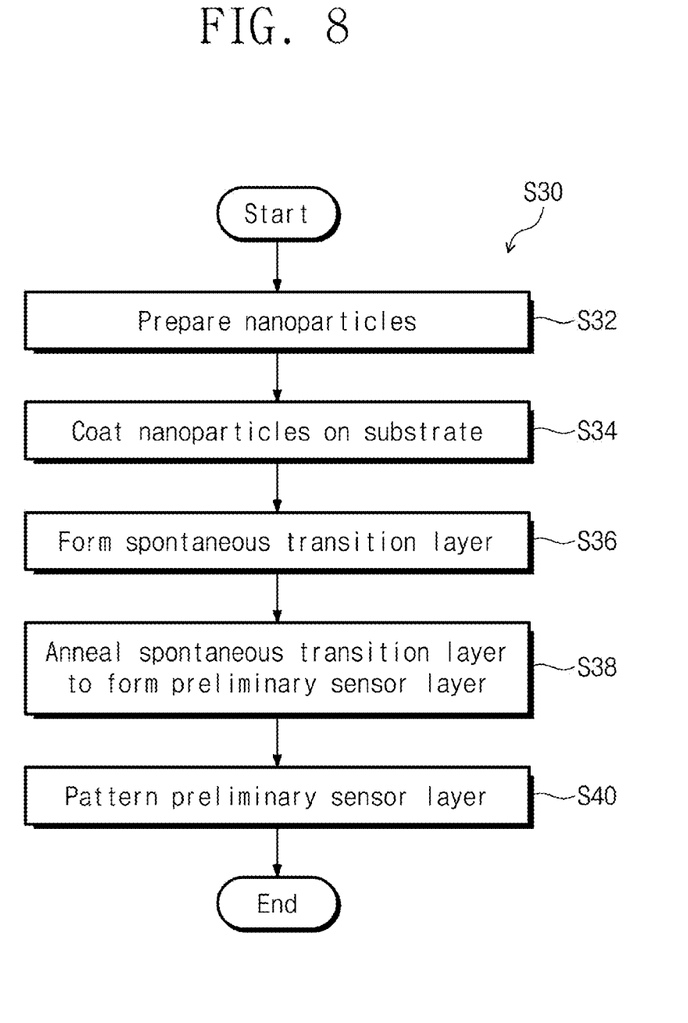
FIG. 8 is a flow chart showing an example of forming a sensor layer of FIG. 7.
Figure 9:
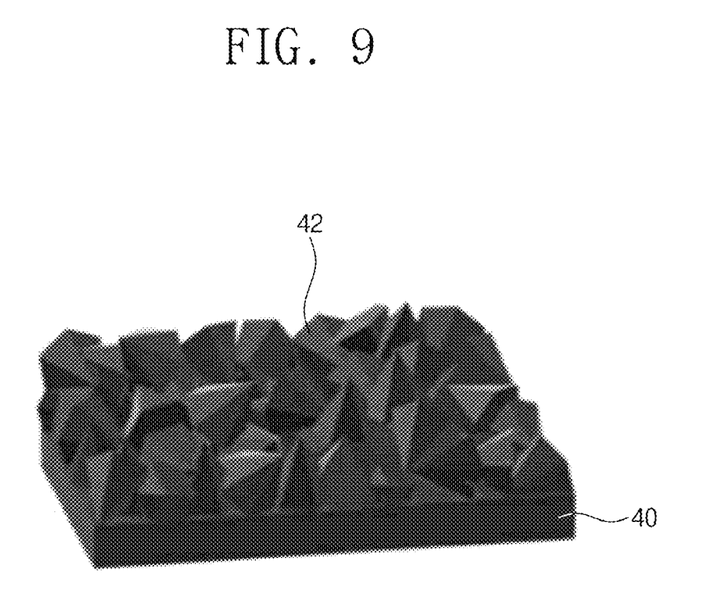
FIG. 9 is a perspective view illustrating an example of nanoparticles of FIG. 4.

FIG. 8 illustrates an example of forming the sensor layer 70 of FIG. 7 (S30). FIG. 9 illustrates an example of nanoparticles 42 of FIG. 4.

Referring to FIGS. 8 and 9, the nanoparticles 42 are prepared (S32). For example, the nanoparticles 42 may include a metal oxide of a first cobalt oxide (h-CoO) having a hexagonal structure. The nanoparticles 42 may have a hexagonal pyramid shape. As an example, the nanoparticles 42 may be prepared according to a standard Schlenk line technique in an argon gas (Ar) atmosphere. For example, the nanoparticles 42 may be obtained from a mixed solution of cobalt acetylacetonate and benzyl amine. Cobalt acetylacetonate in the mixed solution may have a mass of about 0.15 g, and benzyl amine may have a volume of about 7 mL. When the mixed solution is heated to about 190° C. and then stirred for about 2 hours, the nanoparticles 42 of the first cobalt oxide (h-CoO) may be precipitated. Supernatant in the mixed solution may be removed by centrifugation, and the nanoparticles 42 may be extracted. The nanoparticles 42 may be washed with an organic solvent of ethanol.

Figure 4:
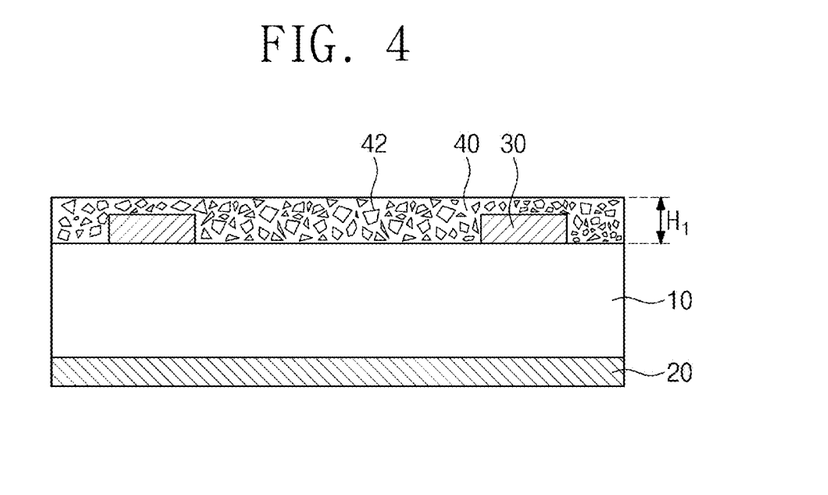

Referring to FIGS. 4 and 8, the nanoparticles 42 are applied to the substrate 10 to form a nanoparticle layer 40 (S34). The nanoparticles 42 may be dispersed in ethanol. The nanoparticles 42 and the ethanol may be applied to the substrate 10 by spin coating. The substrate 10 may be rotated at a rotation speed of about 1000 rpm to about 3000 rpm for about 30 seconds. Thereafter, ethanol may be vaporized. Alternatively, the nanoparticles 42 may be applied by a printing method and the embodiment of the inventive concept is not limited thereto.

Figure 10:
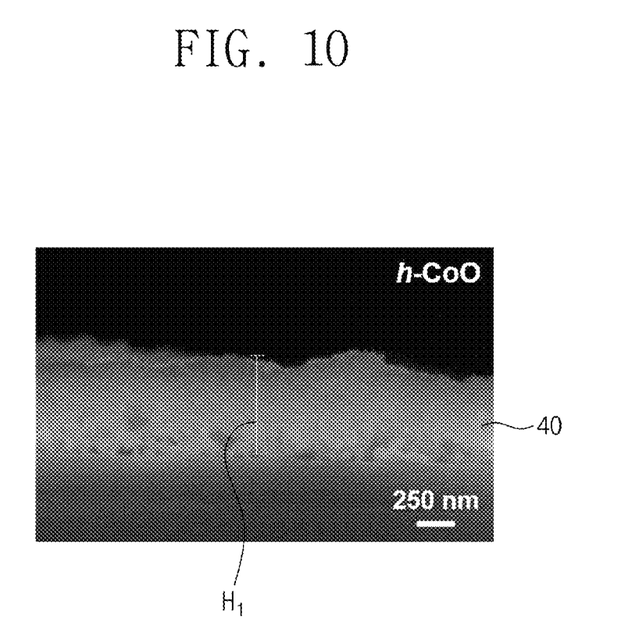
FIG. 10 is a cross-sectional scanning microscope image showing an example of a nanoparticle layer of FIG. 4.

FIG. 10 is a cross-sectional scanning microscope (SEM) image showing an example of the nanoparticle layer 40 of FIG. 4.

Referring to FIGS. 4 and 10, the nanoparticle layer 40 may have a first thickness $H_1$ of about 600 nm.

Figure 5:
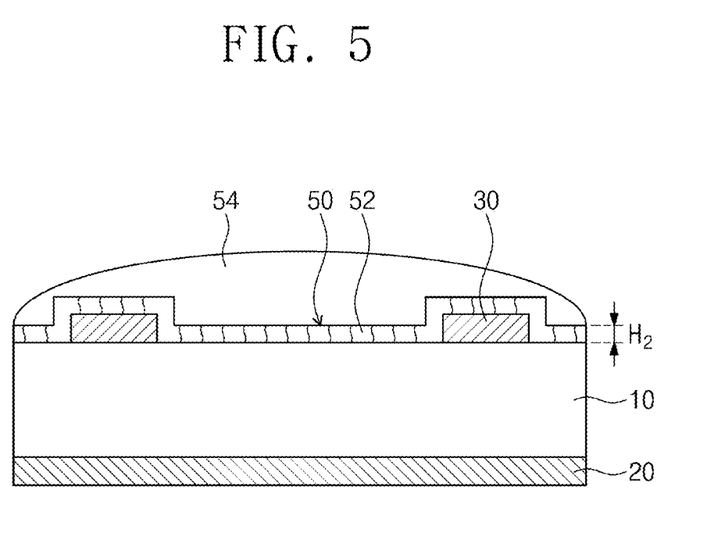

Referring to FIGS. 5 and 8, deionized water 54 is provided on the nanoparticle layer 40 to form a spontaneous transition layer 50 (S36). For example, the substrate 10 may be dipped in the deionized water 54 for about 2 to about 6 hours. For example, the spontaneous transition layer 50 may include cobalt hydroxide ($\beta$-Co(OH)$_2$).

Figure 11:
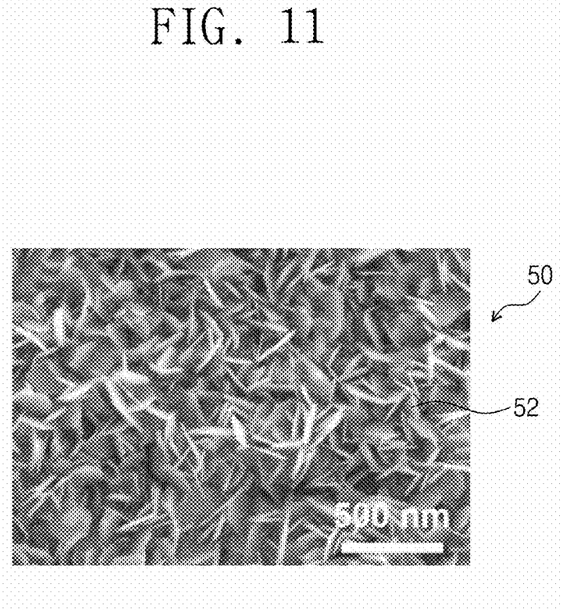
FIGS. 11 and 12 are planar and cross-sectional scanning microscope images showing an example of a spontaneous transition layer of FIG. 5.
Figure 12:
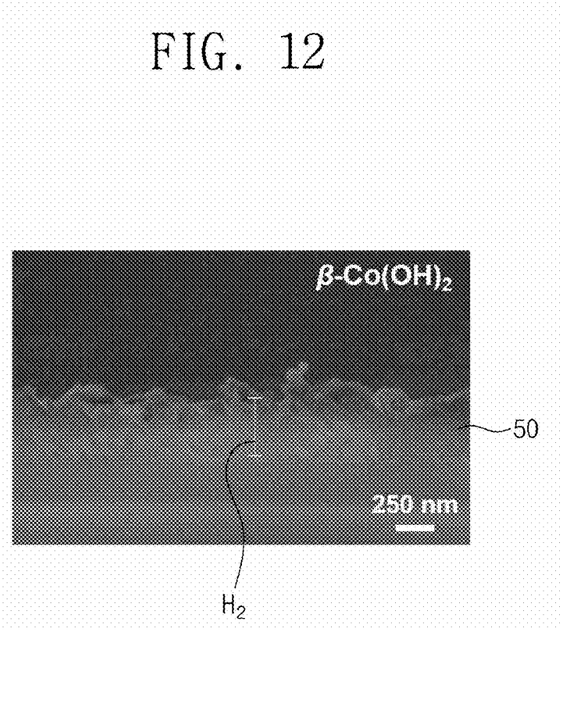
Figure 13:
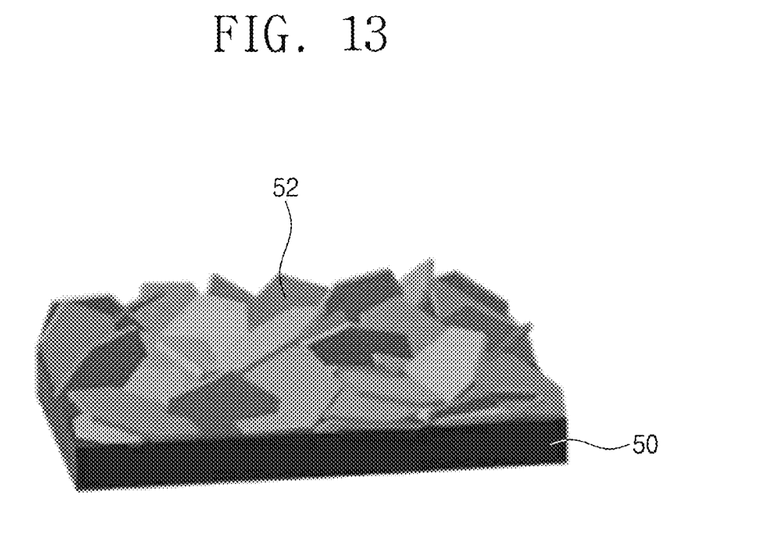
FIG. 13 is a perspective view illustrating an example of a first plate crystal of FIG. 11.

FIGS. 11 and 12 are planar and cross-sectional scanning microscope images showing an example of the spontaneous transition layer 50 of FIG. 5. FIG. 13 is a perspective view illustrating an example of a first plate crystal 52 of FIG. 11.

Referring to FIGS. 5 and 11 to 13, the spontaneous transition layer 50 may have a second thickness $H_2$ and may have the first plate crystal 52. The second thickness $H_2$ may be smaller than the first thickness $H_1$. For example, the second thickness $H_2$ may be about 300 nm. The first plate crystal 52 may have a hexagonal octahedron shape. The first plate crystal 52 may have a length of about 200 nm to about 300 nm.

Figure 6:
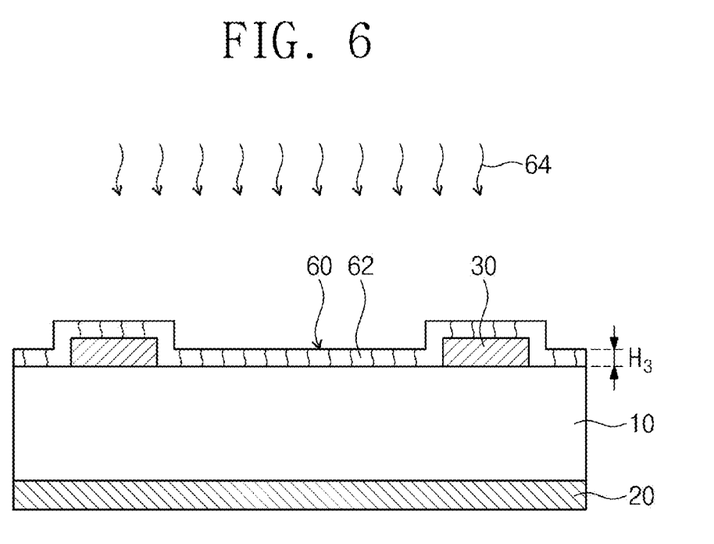

Referring to FIGS. 6 and 8, the spontaneous transition layer 50 is annealed to form a preliminary sensor layer 60 (S38). The spontaneous transition layer 50 may be annealed by radiant heat 64 or light. According to the embodiment of the inventive concept, the spontaneous transition layer 50 may be annealed at a temperature lower than the melting point (for example, about 895° C.) of a second cobalt oxide. For example, the spontaneous transition layer 50 may be annealed at a temperature of about 500° C. The preliminary sensor layer 60 may include a second cobalt oxide ($Co_3O_4$) having a spinel structure.

Figure 14:
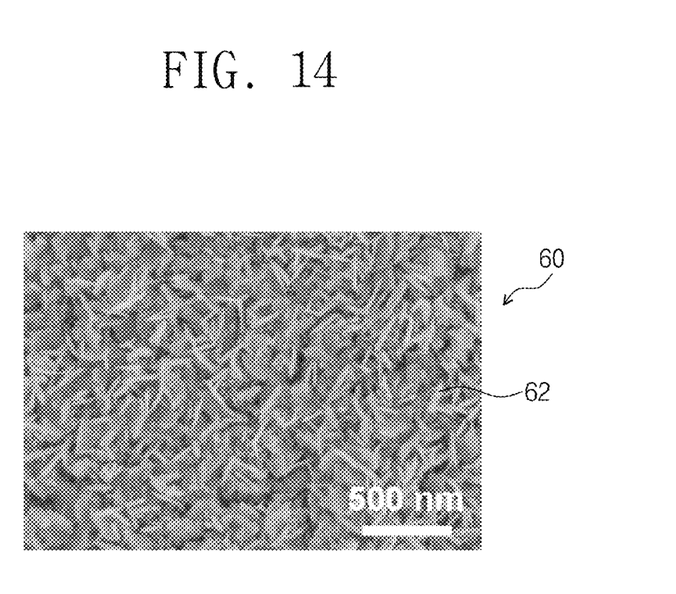
FIG. 14 is a planar scanning microscope image showing an example of a preliminary sensor layer of FIG. 6.

FIG. 14 is a planar scanning microscope image showing an example of the preliminary sensor layer 60 of FIG. 6.

Referring to FIGS. 6 and 14, the preliminary sensor layer 60 may have a third thickness $H_3$ and a second plate crystal 62. The third thickness $H_3$ may be similar to or smaller than the second thickness $H_2$. The second plate crystal 62 may be similar to or larger than the first plate crystal 52.

Figure 15:
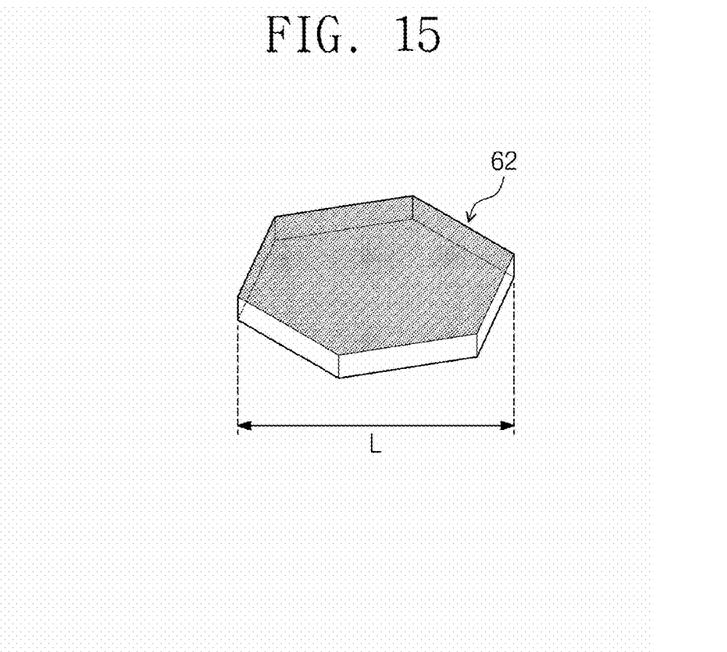
FIG. 15 is a perspective view illustrating an example of a second plate crystal of FIG. 12.

FIG. 15 shows an example of the second plate crystal 62 of FIG. 12.

Referring to FIG. 15, the second plate crystal 62 may have a hexagonal octahedron shape. The second plate crystal 62 may have a length L of about 200 nm to about 300 nm.

Referring to FIGS. 7 and 8, the preliminary sensor layer 60 is patterned to form the sensor layer 70 (S40). The preliminary sensor layer 60 may be patterned by an electron beam lithography method or a photolithography method. For example, the sensor layer 70 may have a good response and/or sensitivity to acetone gas. For example, the sensor 100 may be an acetone gas sensor.

Figure 16:
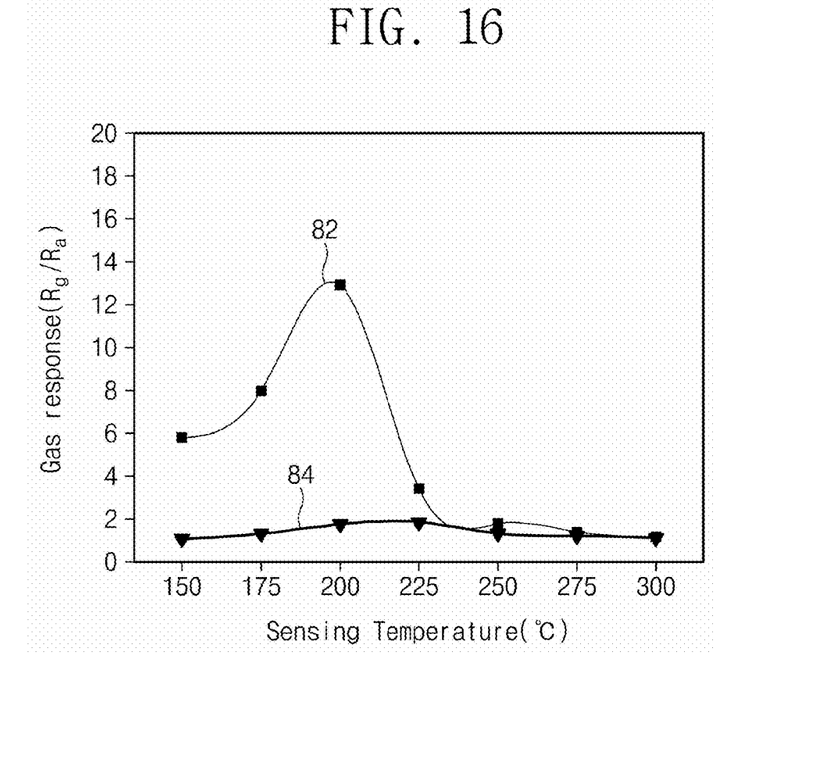
FIG. 16 is a graph showing a response of the sensor layer of FIG. 7 and a response of a typical sensor layer.

FIG. 16 shows a response 82 of the sensor layer of FIG. 7 and a response 84 of a typical sensor layer.

Referring to FIG. 16, the response 82 of the sensor layer 70 may be about 7 times higher than the response 84 of the typical sensor layer (74 of FIG. 17) at a sensing temperature of about 200° C. Each of the response 82 of the sensor layer 70 and the response 84 of the typical sensor layer 74 was obtained on the basis of about 1 ppm of acetone gas.

Figure 17:
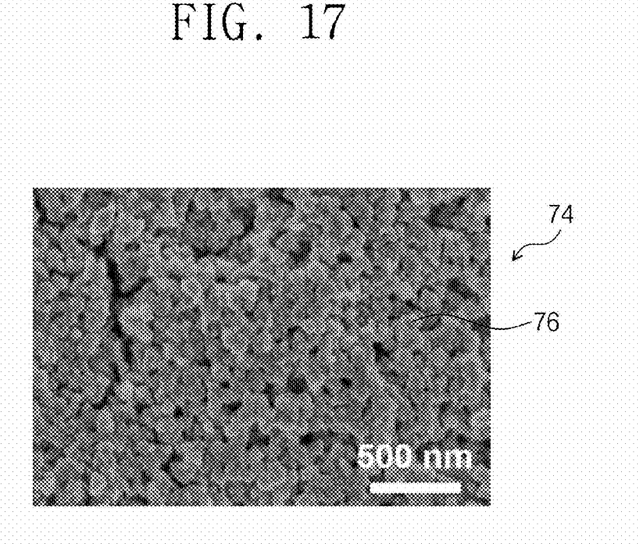
FIG. 17 is a planar scanning microscope image showing an example of the typical sensor layer.

FIG. 17 is a planar scanning microscope image showing an example of the typical sensor layer 74.

Referring to FIG. 17, the typical sensor layer 74 may include cobalt oxide grains 76. The cobalt oxide grains 76 may be deposited by a sputtering or chemical vapor deposition method. The cobalt oxide grain 76 may be different from the second plate crystal 62. For example, the cobalt oxide grain 76 may have a ball shape. The cobalt oxide grain 76 may be smaller than the second plate crystal 62. The adhesive force of the cobalt oxide grain 76 to the substrate 10 may be lower than that of the second plate crystal 62.

Figure 18:
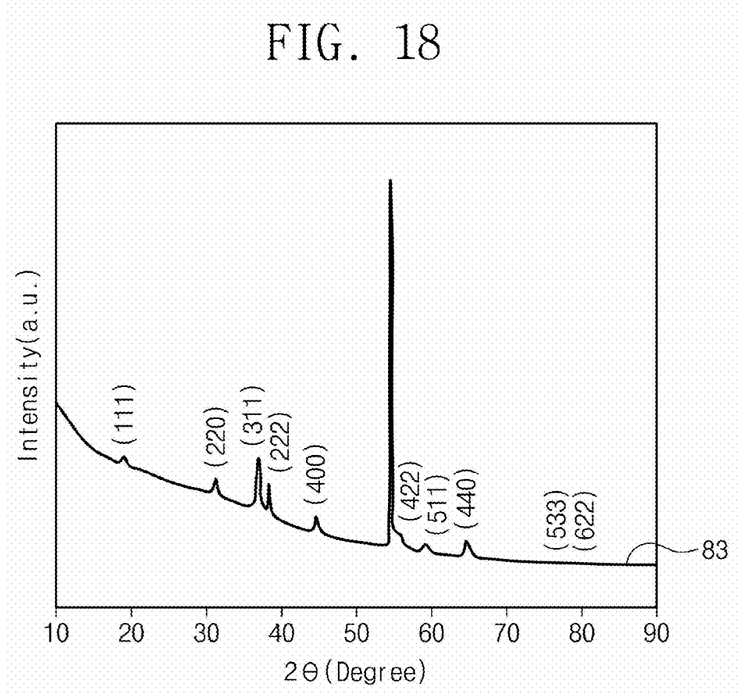
FIG. 18 is a graph showing X-ray diffraction of a second plate crystal of FIG. 15.
Figure 19:
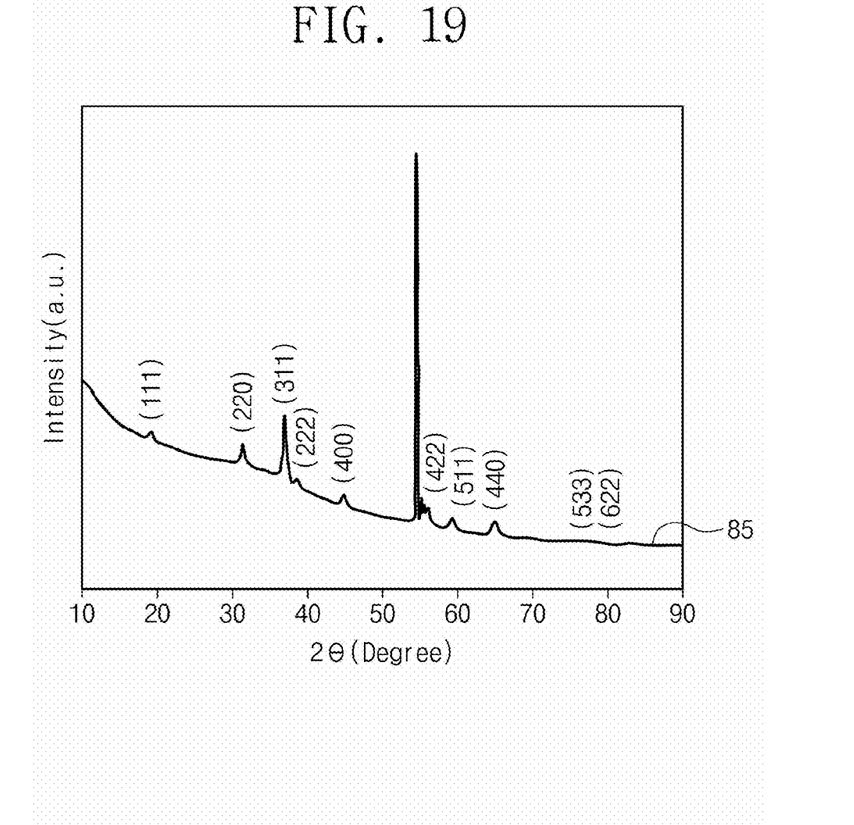
FIG. 19 is a graph showing X-ray diffraction of a cobalt oxide grain of FIG. 17.

FIG. 18 is an X-ray diffraction (XRD) graph of the second plate crystal 62 of FIG. 15, and FIG. 19 is an X-ray graph of the cobalt oxide grain 76 of FIG. 17.

Referring to FIGS. 18 and 19, an XRD graph 83 of the second plate crystal 62 may have a peak on a (222) plane higher than a peak on a (222) plane of an XRD graph 85 of the cobalt oxide grain 76.

Figure 20:
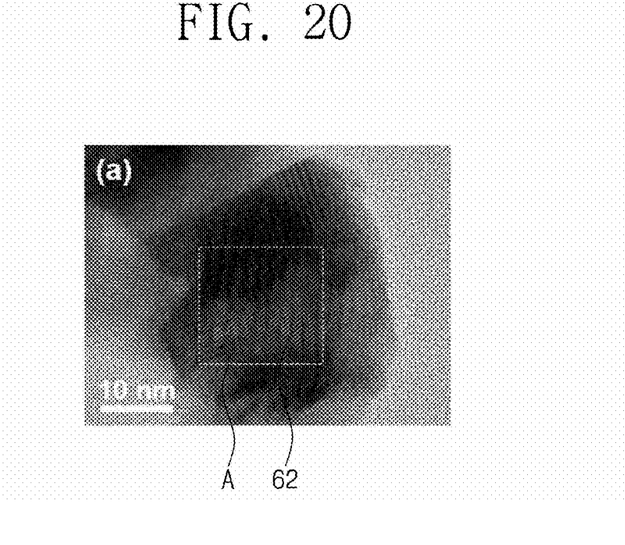
FIG. 20 is a transmission electron microscope image showing an example of the sensor layer of FIG. 7.
Figure 21:
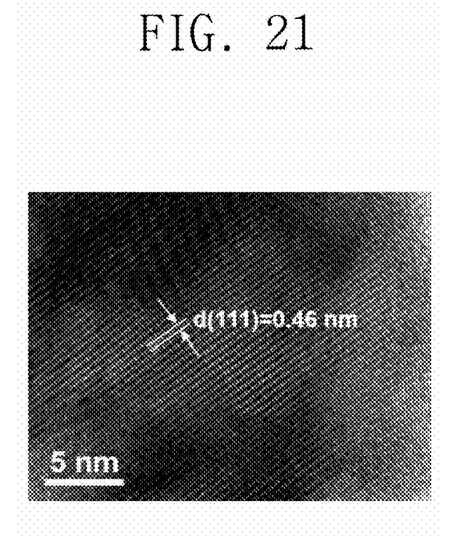
FIG. 21 is an enlarged transmission electron microscope image of a portion A of FIG. 20.

FIG. 20 is a transmission electron microscope (TEM) image showing an example of the sensor layer 70 of FIG. 7, and FIG. 21 is an enlarged transmission electron microscope image of a portion A of FIG. 20.

Referring to FIGS. 20 and 21, the second plate crystal 62 may have a distanced between (111) planes of about 0.46 nm.

Figure 22:
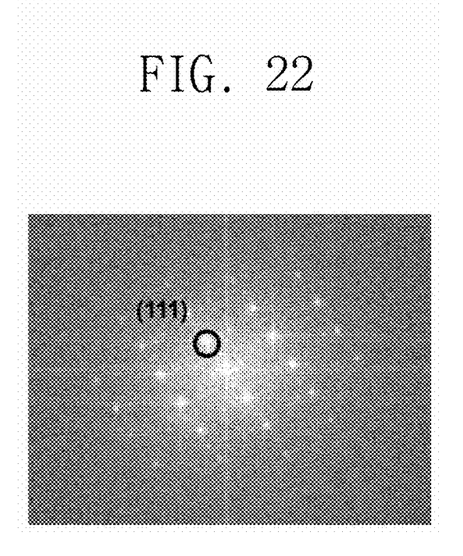
FIG. 22 is a view illustrating a fast Fourier transform pattern obtained from the transmission electron microscope image of FIG. 20.

FIG. 22 shows a fast Fourier transform pattern obtained from the transmission electron microscope image of FIG. 20.

Referring to FIG. 22, the second plate crystal 62 of the sensor layer 70 may have a (111) plane. Although not shown, the second plate crystal 62 may have the (222) plane.

Figure 23:
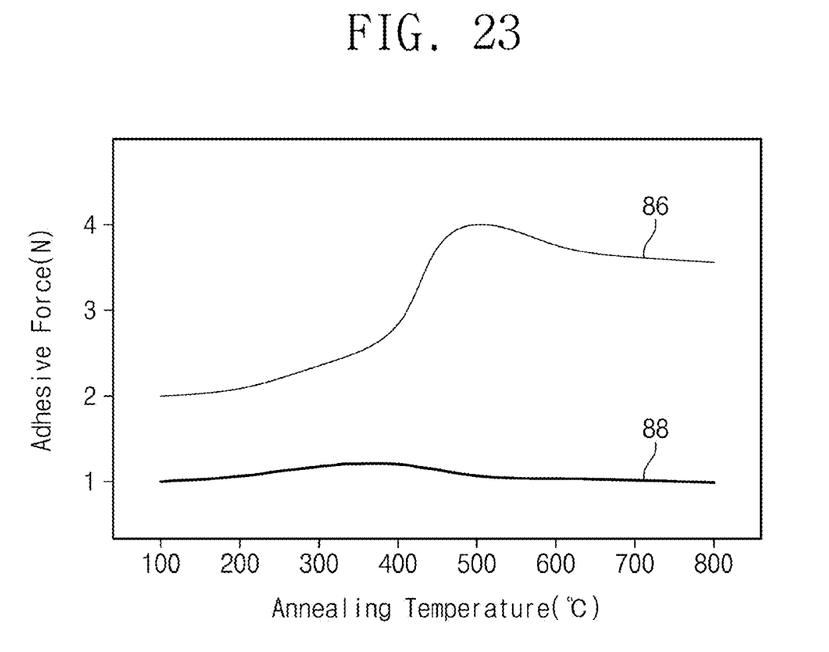
FIG. 23 is a graph showing an adhesive force of the preliminary sensor layer according to the annealed temperature of a substrate of FIG. 6 and an adhesive force of the typical sensor layer.

FIG. 23 shows a first adhesive force 86 of the preliminary sensor layer 60 and a second adhesive force 88 of the typical sensor layer 74 according to the annealed temperature of the substrate 10 of FIG. 6.

Referring to FIG. 23, the first adhesive force 86 of the sensor layer 70 may be higher than the second adhesive force 88 of the typical sensor layer 74. The first adhesive force 86 may be maximum at an annealed temperature of about 500° C. The first adhesive force 86 and the second adhesive force 88 may be measured using scotch tape.

Figure 24:
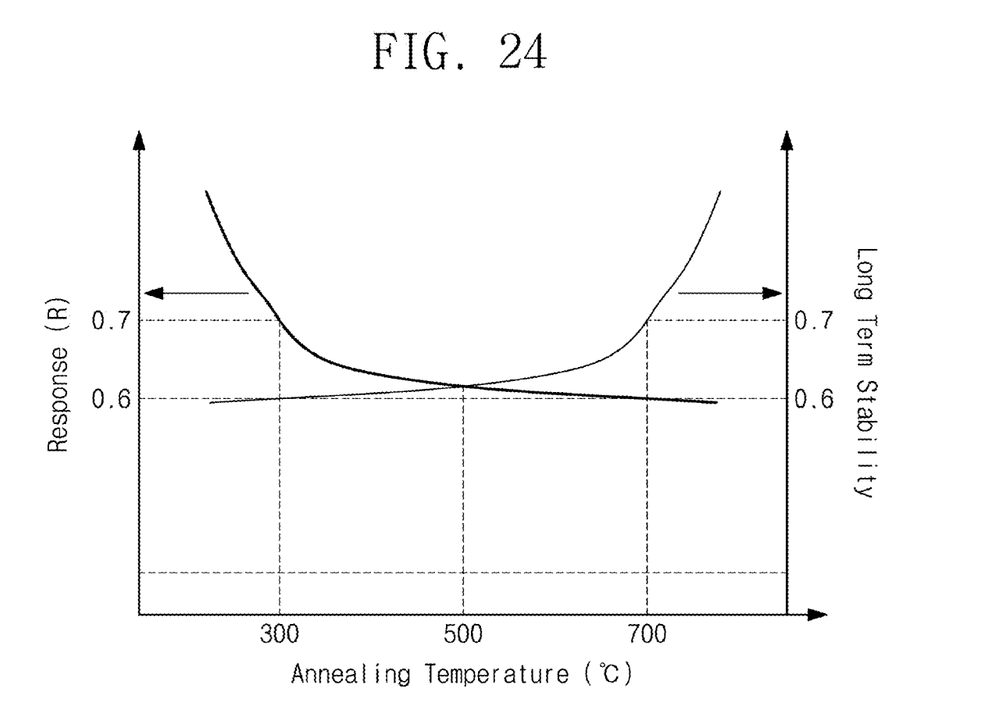
FIG. 24 shows a response and a long term stability of a sensor layer according to annealing temperatures of a substrate of FIG. 6.

FIG. 24 shows a response and a long term stability of the sensor layer 70 according to annealing temperatures of the substrate 10 of FIG. 6. Here, each of a response and long term stability may be normalized values.

Referring to FIG. 24, if an annealing temperature of the substrate 10 is about 300° C. to about 700° C., the sensor layer 70 may have an appropriate response and long term stability, which are 0.6 to about 0.7. The sensor layer 70 may have a lifespan of about 3 to about 5 years. If the annealing temperature of the substrate 10 is about 500° C., the sensor layer 70 may have an optimum response and optimum long term stability. If the annealing temperature of the substrate 10 is lower than about 300° C., the response of the sensor layer 70 may be improved and the long term stability of the sensor layer 70 may be bad. If the annealing temperature of the substrate 10 is higher than about 700° C., the response of the sensor layer 70 may be bad and the long term stability of the sensor layer 70 may be improved. The sensor layer 70 may be degraded.

The method of manufacturing a sensor according to the inventive concept may anneal a spontaneous transition layer to increase a response of a sensor layer to acetone gas, and to increase the adhesive force to a substrate.

As described above, an embodiment has been disclosed in the drawings and the specification. Although specific terms are used herein, the terms are only for the purpose of describing the present invention and are not intended to limit the meaning or the scope of the present invention as set forth in the claims. Therefore, it is to be understood to those skilled in the art that various modifications and other equivalent embodiments are may be made therefrom. As a result, the true technical protection scope of the present invention is to be determined by the technical spirit of the appended claims.

What is claimed is:

1. A method of manufacturing a sensor, the method comprising:
    forming a plurality of electrodes on a substrate; and
    forming a sensor layer on the substrate between the plurality of electrodes, wherein forming the sensor layer includes:
    coating a nanoparticle layer to the substrate;
    providing deionized water on the nanoparticle layer to form a spontaneous transition layer which includes cobalt hydroxide; and
    annealing the spontaneous transition layer at a temperature of 300° C. to 700° C. to increase lifespan and response characteristics of the sensor layer.

2. The method of claim 1, wherein the nanoparticle layer includes a first cobalt oxide (CoO).

3. The method of claim 1, wherein
the nanoparticle layer has hexagonal pyramid-shaped nanoparticles.

4. The method of claim 1, wherein
the sensor layer has a response and long term stability, which are 0.6 to 0.7.

5. The method of claim 1, wherein
the sensor layer includes a second cobalt oxide ($Co_3O_4$).

6. The method of claim 5, wherein
the spontaneous transition layer is annealed at a temperature lower than a melting point of the second cobalt oxide.

7. The method of claim 1, wherein
the annealing temperature is 500° C.

8. The method of claim 1, wherein
the spontaneous transition layer has a first plate crystal, and
the sensor layer has a second plate crystal similar to the first plate crystal.

9. The method of claim 8, wherein
the second plate crystal has a hexagonal octahedron shape.

10. The method of claim 1, wherein
the nanoparticle layer has a first thickness, and
the spontaneous transition layer has a second thickness smaller than the first thickness.

11. The method of claim 10, wherein
the first thickness is 600 nm, and
the second thickness is 300 nm.

12. The method of claim 10, wherein
the sensor layer has a third thickness equal to or smaller than the second thickness.

13. The method of claim 12, wherein
forming the sensor layer further includes forming a preliminary sensor layer having the third thickness.

14. The method of claim 1, further comprising:
forming a heater electrode on a bottom surface of the substrate facing the plurality of electrodes and the sensor layer.

15. The method of claim 1, wherein
forming the sensor layer further includes preparing nanoparticles, and
the nanoparticles are prepared according to a standard Schlenk line technique.

16. The method of claim 15, wherein
preparing the nanoparticles includes:
obtaining a mixed solution of cobalt acetylacetonate and benzyl amine;
stirring the mixed solution to precipitate the nanoparticles; and
removing supernatant in the mixed solution to extract the nanoparticles.

* * * * *